United States Patent
Neveux et al.

(10) Patent No.: US 7,172,748 B1
(45) Date of Patent: Feb. 6, 2007

(54) METHOD FOR THE SOLID SYNTHESIS OF FERRATES OF ALKALINE OR ALKALINE EARTH METALS AND FERRATES OBTAINED ACCORDING TO THIS METHOD

(75) Inventors: Nathalie Neveux, Mereville (FR); Ndue Kanari, Vandoeuvre (FR); Ibrahim Gaballah, Vandoeuvre (FR); Omer Evrard, Vandoeuvre (FR)

(73) Assignee: Centre International de l'Eau - NAN.C.I.E., Vandoeuvre les Nancy (FR)

( * ) Notice: Subject to any disclaimer, the term of this patent is extended or adjusted under 35 U.S.C. 154(b) by 547 days.

(21) Appl. No.: 10/111,158

(22) PCT Filed: Oct. 13, 2000

(86) PCT No.: PCT/FR00/02851

§ 371 (c)(1),
(2), (4) Date: Aug. 26, 2002

(87) PCT Pub. No.: WO01/28928

PCT Pub. Date: Apr. 26, 2001

(30) Foreign Application Priority Data

Oct. 22, 1999 (FR) .................................. 99 13389

(51) Int. Cl.
*C01G 49/00* (2006.01)

(52) U.S. Cl. ................................................. 423/594.2

(58) Field of Classification Search .............. 423/594.2
See application file for complete search history.

(56) References Cited

U.S. PATENT DOCUMENTS

| 4,405,573 A | | 9/1983 | Deininger et al. |
| 5,284,642 A | | 2/1994 | Evrard et al. |
| 5,370,857 A | | 12/1994 | Deininger |
| 5,746,994 A | * | 5/1998 | Johnson .................. 423/594.2 |

FOREIGN PATENT DOCUMENTS

| EP | 0354843 | 2/1990 |
| EP | 0504156 | 9/1992 |

OTHER PUBLICATIONS

Chemical Abstracts, vol. 132, No. 16—Published: Apr. 17, 2000 (Abstract No. 209831, citing Neveux: "Synthesis of Stabilized Potassium Ferrate").

Neveux, N., et al., "Synthesis of Stabilized Potassium Ferrate", REWAS '99—Global Symp. Recycl., Waste Treat. Clean Tech. Proc., vol. 3, pp. 2417 to 2427 (1999).

* cited by examiner

*Primary Examiner*—Steven Bos
(74) *Attorney, Agent, or Firm*—Gary M. Cohen

(57) ABSTRACT

A process for the synthesis of ferrates of alkali metals or alkaline earth metals using a solid route reacts an iron salt and a hydroxide of alkali metals or alkaline earth metals in the presence of chlorine gas provided in the form of a ($Cl_2$+air) mixture comprising not more than 10% of chlorine by volume. Also the ferrates thus obtained.

6 Claims, No Drawings

METHOD FOR THE SOLID SYNTHESIS OF FERRATES OF ALKALINE OR ALKALINE EARTH METALS AND FERRATES OBTAINED ACCORDING TO THIS METHOD

The subject matter of the present invention relates to a process for the synthesis of ferrates of alkali metals or alkaline earth metals, using a solid route, and to the ferrates thus obtained.

Processes for the synthesis of ferrates of alkali metals or alkaline earth metals using a wet route are already known. The general formula of these synthesized compounds is $MFeO_4$, in which M represents an alkaline earth metal atom or two alkali metal atoms. Nevertheless, these ferrates are unstable, particularly in an aqueous medium, because of their interaction with water according to the following reaction:

$$2FeO_4^{2-} + 5H_2O \rightarrow 2Fe(OH)_3 + 4OH^- + 3/2 O_2. \qquad (A)$$

This explains the low yield from the synthesis of ferrates using a wet route, whatever the process employed. Furthermore, these ferrates decompose over time and, consequently, it is not possible to envisage an industrial process without a stabilization of such ferrates.

More recently, U.S. Pat. No. 5,284,642 has disclosed a process for the synthesis of ferrates of alkali metals and alkaline earth metals having a general formula:

$$M(Fe, X)O_4,$$

in which M denotes two Na or K atoms or one Ca or Ba atom and X is an atom, the cation of which has the electronic structure of a rare gas. According to U.S. Pat. No. 5,284,642, the X atom can be chosen from Al, Si, P, S, Cl, Mo, Mn, Cr and mixtures of these atoms. The theoretical aspect of the stabilization of ferrates by substituting a portion of the iron in the structure by one of the abovementioned elements is also disclosed by this patent.

U.S. Pat. No. 5,284,642 discloses, inter alia, the synthesis of a ferrate having the formula:

$$K_2(Fe, S)O_4,$$

which is prepared by reacting ferrous sulfate hydrate ($FeSO_4 \cdot 7H_2O$), calcium hypochlorite ($Ca(ClO)_2$) and potassium hydroxide (KOH) in the solid state.

However, the disclosed process, which involves a solid chlorinated oxidant, in this instance $Ca(ClO)_2$, is very expensive to implement. The main objective of the present invention is to replace $Ca(ClO)_2$ with another, cheaper oxidant.

SUMMARY OF THE INVENTION

In accordance with the present invention, this result is achieved by a process for the synthesis of ferrates of alkali metals or alkaline earth metals, using a solid route, wherein the oxidant is chlorine gas.

DETAILED DESCRIPTION OF THE INVENTION

More specifically, the synthesis of ferrates of alkali metals or alkaline earth metals in accordance with the present invention is performed by simultaneously bringing three substances into contact; namely, two solid phases, respectively, an iron salt and a hydroxide of alkali metals or alkaline earth metals, and a gas phase, in this instance chlorine. By way of example, the following equation (B) describes the synthesis of the potassium sulfatoferrate of the present invention using $FeSO_4 \cdot xH_2O$, KOH and $Cl_2$. Ferrous sulfate ($FeSO_4 \cdot 7H_2O$) was chosen as the iron salt for the present invention because this salt is a by-product of the $TiO_2$ industry, and of the surface treatment of steels, and is cheap and high in purity.

$$FeSO_4 \cdot xH_2O + 2Cl_2 + 8KOH \rightarrow 2K_2(Fe_{0.5}, S_{0.5})O_4 + 4KCl + (x+4)H_2O \qquad (B)$$

In accordance with the present invention, the ferrous sulfate ($FeSO_4 \cdot 7H_2O$) is dehydrated at temperatures of greater than 100° C., preferably at approximately 125° C., to yield essentially $FeSO_4 \cdot H_2O$. The ferrous sulfate grains were greatly weakened during this treatment. However, homogenization of the particles is preferable for the process for the synthesis of the ferrates to progress well. Provision has, therefore, been made to prepare the ferrates after partial dehydration of ferrous sulfate heptahydrate. On the other hand, no preliminary treatment of KOH and $Cl_2$ is necessary.

In order to achieve good simultaneous contact of the three substances, according to the present invention, the most appropriate reactor for the preparation of the ferrates is a rotary type. The dimensioning of the reactor depends on the amount of the sample and on the energy balance of the process. Due to the exothermic nature of the reaction for the synthesis of the ferrates, all the walls of the reactor can advantageously be cooled by a thermostatic fluid, in particular, water. It is preferable that the temperature in the sample during the synthesis does not exceed 100° C.

In accordance with the present invention, a $Cl_2$+air mixture, rather than a $Cl_2$+$N_2$ mixture, is used as the oxidizing agent because of the cost of the process. The ($Cl_2$+air) mixture comprises not more than 10% of chlorine by volume. Furthermore, the presence of oxygen can prevent the decomposition of the ferrates during the synthesis (see, reaction A). The flow rates of the oxidant mixture and its chlorine content will depend on the amount of the sample, on the degree of hydration of the ferrous sulfate (see, reaction B) and on the reaction time. The amount of chlorine can be kept greater than the stoichiometry of the reaction (B) and the unreacted chlorine can be recycled.

The reaction times depend on the interplay of many different parameters, such as the amount of the sample, the degree of hydration of the ferrous sulfate, the number of revolutions of the reactor, the flow rate of the oxidizing gas mixture, the chlorine content of the gas mixture, the moisture content of the gas mixture and the cooling conditions of the reactor.

The present invention is further illustrated by the following nonlimiting examples, which will clearly show how the improvements of the present invention can be implemented for the preparation of $K_2(Fe_{0.5}, S_{0.5})O_4$.

EXAMPLE 1

A cylindrical reactor with a cross-section of approximately 10 cm² and having smooth walls was used. The chemical composition of the ferrous sulfate originating from a $TiO_2$ production plant which was used for this experiment is given in Table 1, below. A mixture of approximately 8 grams of ($FeSO_4 \cdot H_2O$+KOH) comprising approximately 1.5 times more $FeSO_4 \cdot H_2O$ than the stoichiometric amount of the reaction (B) was used. The rate of rotation of the reactor was 12 revolutions/minute. A $Cl_2$+air gas mixture comprising 7% of $Cl_2$ was circulated for 30 minutes.

The products thus obtained were sieved in order to separate the unconsumed ferrous sulfate, and were re-used in Example 2. The product comprising the potassium sulfatoferrate was dried at approximately 65° C. for 24 hours. The production yield for the ferrate is of the order of 60%.

TABLE 1

| Composition | | | |
|---|---|---|---|
| (% by weight) | | (ppm) | |
| Total Fe | 19.7 | Zn | 190 |
| Fe (III) | 0.3 | Cu | <3 |
| $SO_4$ | 34.8 | Cr | <1 |
| | | Pb | 2 |
| | | Ni | 26 |
| | | Cd | <1 |
| | | Co | 19 |
| | | Mn | 2,038 |
| | | Hg | <1 |
| | | Te | <1 |
| | | As | <1 |
| | | Ti | 890 |

EXAMPLE 2

The ferrous sulfate used for this example is that which did not react in the experiment of Example 1, and all the conditions of the present experiment were the same as those set in the experiment of Example 1. Likewise, the production yield for the ferrate is of the order of 60%.

EXAMPLE 3

The chemical composition of the ferrous sulfate originating from a plant for the surface treatment of steels which was used for this experiment is given in Table 2. All the conditions of this experiment were the same as those set in the experiment of Example 1. The production yield for the ferrate is of the order of 50%.

TABLE 2

| Composition | | | |
|---|---|---|---|
| (% by weight) | | (ppm) | |
| Total Fe | 19.9 | Zn | 12.5 |
| Fe (III) | 0.2 | Cu | 6 |
| $SO_4$ | 35.3 | Cr | 28 |
| | | Pb | 80 |
| | | Ni | 57.5 |
| | | Cd | <1 |

TABLE 2-continued

| Composition | |
|---|---|
| (% by weight) | (ppm) |
| Co | <1 |
| Mn | 925 |
| Hg | <1 |
| Te | <1 |
| As | <1 |
| Ti | 24 |

The process of the present invention has been described with reference to ferrous sulfate and to KOH as starting solids. However, the process of the present invention is also applicable to the preparation of ferrates using other iron salts and other hydroxides of alkali metals or alkaline earth metals. The ferrates find a particularly advantageous application in the treatment of water and liquid effluents.

Of course, various modifications to the devices or processes which have previously been described solely by way of non-limiting examples can be made by a person skilled in the art without departing from the scope of the present invention.

The invention claimed is:

1. A process for synthesizing stable ferrates of alkali metals or alkaline earth metals using a solid route, comprising the step of reacting an iron salt and a hydroxide of alkali metal or alkaline earth metal in the presence of chlorine gas provided in the form of a ($Cl_2$+air) mixture comprising not more than 10% of chlorine by volume.

2. The process of claim 1 which further includes the steps of:
   placing the iron salt and the hydroxide of alkali metal or alkaline earth metal in a rotary reactor;
   introducing a gas mixture comprising the chlorine gas into the reactor;
   sieving products exiting from the reactor to separate the ferrates; and
   drying the separated ferrates.

3. The process of claim 1 wherein the iron salt is ferrous sulfate heptahydrate.

4. The process of claim 3 which further includes the step of partially dehydrating the ferrous sulfate heptahydrate at approximately 125° C.

5. The process of claim 1 wherein the hydroxide of alkali metal or alkaline earth metal is KOH.

6. The process of claim 1 wherein the ($Cl_2$+air) mixture comprises approximately 7% of chlorine by volume.

* * * * *